(12) United States Patent
Yamamoto

(10) Patent No.: US 10,471,999 B2
(45) Date of Patent: Nov. 12, 2019

(54) VEHICLE FRONT STRUCTURE

(71) Applicant: Toyota Jidosha Kabushiki Kaisha, Toyota-shi, Aichi-ken (JP)

(72) Inventor: Yohei Yamamoto, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 15 days.

(21) Appl. No.: 15/927,585

(22) Filed: Mar. 21, 2018

(65) Prior Publication Data

US 2018/0281871 A1    Oct. 4, 2018

(30) Foreign Application Priority Data

Mar. 30, 2017    (JP) .................... 2017-067592

(51) Int. Cl.

| B62D 25/18 | (2006.01) |
|---|---|
| B62D 25/10 | (2006.01) |
| B62D 25/16 | (2006.01) |
| B62D 25/08 | (2006.01) |
| B60R 21/34 | (2011.01) |
| B60R 13/08 | (2006.01) |

(52) U.S. Cl.
CPC .......... *B62D 25/18* (2013.01); *B60R 13/0838* (2013.01); *B60R 21/34* (2013.01); *B62D 25/082* (2013.01); *B62D 25/165* (2013.01); *B60R 2021/343* (2013.01); *B62D 25/105* (2013.01)

(58) Field of Classification Search
CPC ............... B60R 21/34; B60R 13/0838; B60R 2021/343; B62D 25/18; B62D 25/082; B62D 25/105; B62D 25/165
See application file for complete search history.

(56) References Cited

U.S. PATENT DOCUMENTS

2014/0175825 A1   6/2014  Shimanaka
2016/0347375 A1   12/2016 Kaba

FOREIGN PATENT DOCUMENTS

| JP | 2003-276645 A | 10/2003 |
|---|---|---|
| JP | 2005-254947 A | 9/2005 |
| JP | 2006-007991 A | 1/2006 |
| JP | 2009-083543 A | 4/2009 |
| JP | 2016222046 A | 12/2016 |
| WO | 2013/018284 A1 | 2/2013 |

*Primary Examiner* — D Glenn Dayoan
*Assistant Examiner* — Melissa A Black
(74) *Attorney, Agent, or Firm* — Dinsmore & Shohl LLP

(57) ABSTRACT

A vehicle front structure includes: a fender panel; an apron member disposed below an inner wall section of the fender panel; a fender protector having a lateral wall mounted on the inner wall section of the fender panel, and a vertical wall extending from an inner end of the lateral wall toward a lower side in the vehicle up-down direction, the vertical wall having an inclined part and a lower wall part, the inclined part being bent from the inner end of the lateral wall toward the lower side and extending so as to incline relative to the vehicle up-down direction, the lower wall part being provided so as to extend from a lower end of the inclined part via a bend toward the lower side; and a sealant provided between a lower end portion of the lower wall part and the apron member.

8 Claims, 9 Drawing Sheets

VEHICLE FRONT STRUCTURE

CROSS-REFERENCE TO RELATED APPLICATIONS

This application claims priority to Japanese Patent Application No. 2017-067592 filed on Mar. 30, 2017, which is incorporated herein by reference in its entirety including specification, drawings and abstract.

BACKGROUND

1. Technical Field

The present disclosure relates to a vehicle front structure.

2. Description of Related Art

In a vehicle front, a hood covering an engine compartment room in an openable and closable manner, a fender panel forming a side surface of the vehicle front, an apron member (body frame member), etc. are disposed. It is known that, to improve the appearance, a space between an inner wall section of the fender panel and the apron member in a vehicle front having such a structure is concealed with a fender protector from the inner side in the vehicle width direction.

Examples of structures relating to a fender protector include the one described in Japanese Patent Application Publication No. 2016-222046 (JP 2016-222046 A). In the structure described in JP 2016-222046 A (the vehicle front structure of the related art), a fender upper cover (hereinafter referred to as a fender protector) has a mount surface which is substantially parallel to a front hood and to which a bracket is fixed, and an inclined surface that extends upward from an outer end of the mount surface in the vehicle width direction so as to incline toward the inner side in the vehicle width direction and covers a border (a parting line between the front hood and the fender panel) from the inner side of the vehicle. When a load is applied to the hood not only from the upper side but also from a lateral side of the vehicle, the inclined surface of the fender protector bends toward the mount surface and thereby absorbs the collision energy to protect pedestrians.

SUMMARY

The above-described vehicle front structure of the related art does not consider sound leakage through an area where the fender protector is disposed (sound leakage from the engine compartment room into the vehicle cabin). Thus, there is room for improvement in securing both pedestrian protection performance and noise-vibration performance (NV performance).

The present disclosure provides a structure that is applied to a vehicle front structure in which a space between an inner wall section of a fender panel and an apron member is concealed with a fender protector, and that can secure both pedestrian protection performance and NV performance.

An aspect of the disclosure provides a vehicle front structure including: a fender panel having an outer wall section that forms a side surface of a vehicle front, and an inner wall section bent from the outer wall section inward in a vehicle width direction at a parting line between a hood of a vehicle and the fender panel; an apron member disposed below the inner wall section of the fender panel in a vehicle up-down direction, the apron member extending in a vehicle front-rear direction; a fender protector disposed so as to cover a space between the inner wall section of the fender panel and the apron member, the fender protector having a lateral wall that is mounted on the inner wall section of the fender panel, and a vertical wall extending from an inner end of the lateral wall in the vehicle width direction toward a lower side in the vehicle up-down direction, the vertical wall having an inclined part and a lower wall part, the inclined part being bent from the inner end of the lateral wall in the vehicle width direction toward the lower side in the vehicle up-down direction and extending so as to incline relative to the vehicle up-down direction, the lower wall part being provided so as to extend from a lower end of the inclined part via a bend toward the lower side in the vehicle up-down direction; and a sealant provided between a lower end portion of the lower wall part and the apron member.

According to the above aspect, the vertical wall of the fender protector is composed of the inclined part that is inclined relative to the vehicle up-down direction, and the lower wall part that is provided so as to extend downward from the lower end of this inclined part via the bend. When a load is input into the hood from the upper side of the vehicle, the vertical wall of the fender protector bends at the bend between the inclined part and the lower wall part, and thereby absorbs the impact due to the input load. Thus, this structure can secure pedestrian protection performance by being able to absorb, with enhanced effect, an impact of a pedestrian hitting his or her head on the hood.

Moreover, according to the above aspect, the sealant is provided between the lower end portion of the fender protector and the apron member. Thus, this structure can also secure NV performance by being able to reduce the transmission of noise from the engine compartment room into the vehicle cabin through an area where the fender protector is disposed.

According to the above aspect, therefore, both pedestrian protection performance and NV performance can be secured.

In the above aspect, the inclined part may be inclined from the inner end of the lateral wall in the vehicle width direction toward an outer side in the vehicle width direction.

When the inclined part of the vertical wall is thus inclined toward the outer side in the vehicle width direction, the vertical wall of the fender protector bends toward the outer side in the vehicle width direction, i.e., toward the opposite side from the engine compartment room, upon input of a load from the upper side of the vehicle, so that interference of the bent vertical wall with devices, pipes, etc. present inside the engine compartment room can be avoided. In addition, when the inclined part of the vertical wall is inclined from the inner end of the lateral wall in the vehicle width direction toward the outer side in the vehicle width direction, the number of edge lines of the fender protector that are visible from the upper side of the vehicle when the hood is opened can be reduced, which contributes to further improvement of the appearance.

In the above aspect, the fender protector may have a slit hole at the bend.

In the above configuration, the metal sheet part of the apron member becomes less visible from the outside of the vehicle when the hood is opened, which contributes to further improvement of the appearance of the interior of the engine compartment room.

In the above aspect, a leading end of the lower end portion of the lower wall portion may be located inward of an inner end of the apron member in the vehicle width direction.

In the above configuration, the vertical wall bends easily upon input of a load from the upper side of the vehicle, so that the impact due to the input load can be absorbed more effectively.

In the above aspect, the fender protector may have a flange that protrudes inward in the vehicle width direction from a lower end of lower end portion of the lower wall part, and the sealant may be provided between a lower surface of the flange and an upper surface of the apron member.

In the above configuration, the flange of the lower wall part of the vertical wall and the sealant can be brought into close surface contact with each other, so that an enhanced sealing effect can be secured.

In the above aspect, a leading end of an inner end of the flange in the vehicle width direction may be located inward of the inner end of the apron member in the vehicle width direction.

In the above configuration, the metal sheet part of the apron member becomes less visible from the outside of the vehicle when the hood is opened, which contributes to further improvement of the appearance of the interior of the engine compartment room.

In the above aspect, a sound absorbent may be packed between the fender protector and the fender panel.

In the above configuration, even when a slit hole is formed at the bend between the inclined part and the lower wall part of the vertical wall, the transmission of noise and heat from the engine compartment room into the vehicle cabin can be reduced.

In the above aspect, the angle formed between the lower wall part and the vehicle up-down direction may be smaller than the angle formed between the inclined part and the vehicle up-down direction. Specifically, the lower wall part may be provided so as not to extend downward parallel to the vehicle up-down direction but to extend downward at an angle to the vehicle up-down direction that is smaller than the angle formed between the inclined part and the vehicle up-down direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
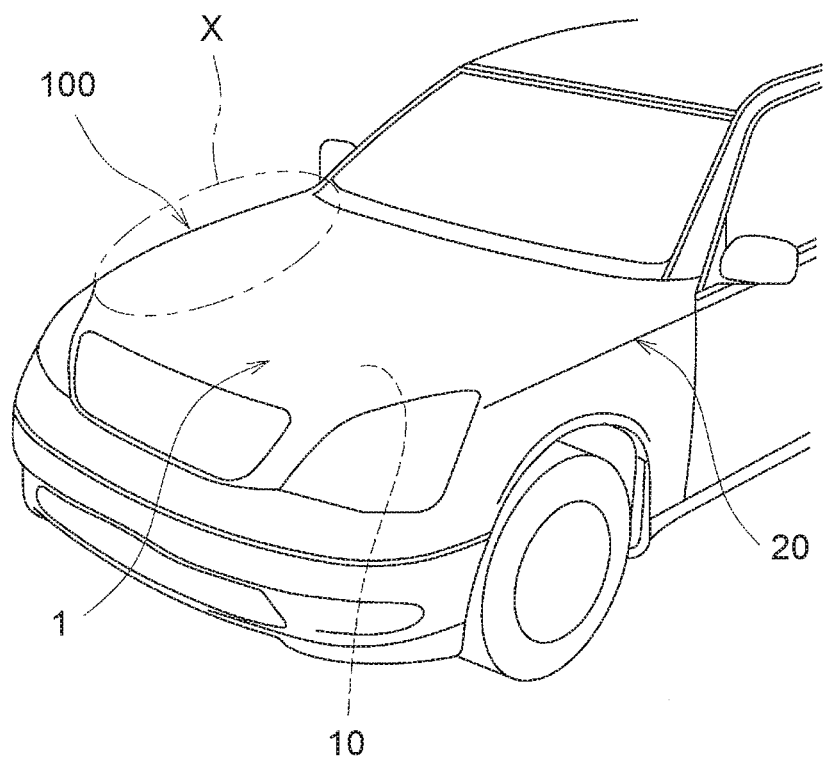
FIG. 1 is a perspective view of a vehicle to which a vehicle front structure of the present disclosure is applied.
Figure 2:
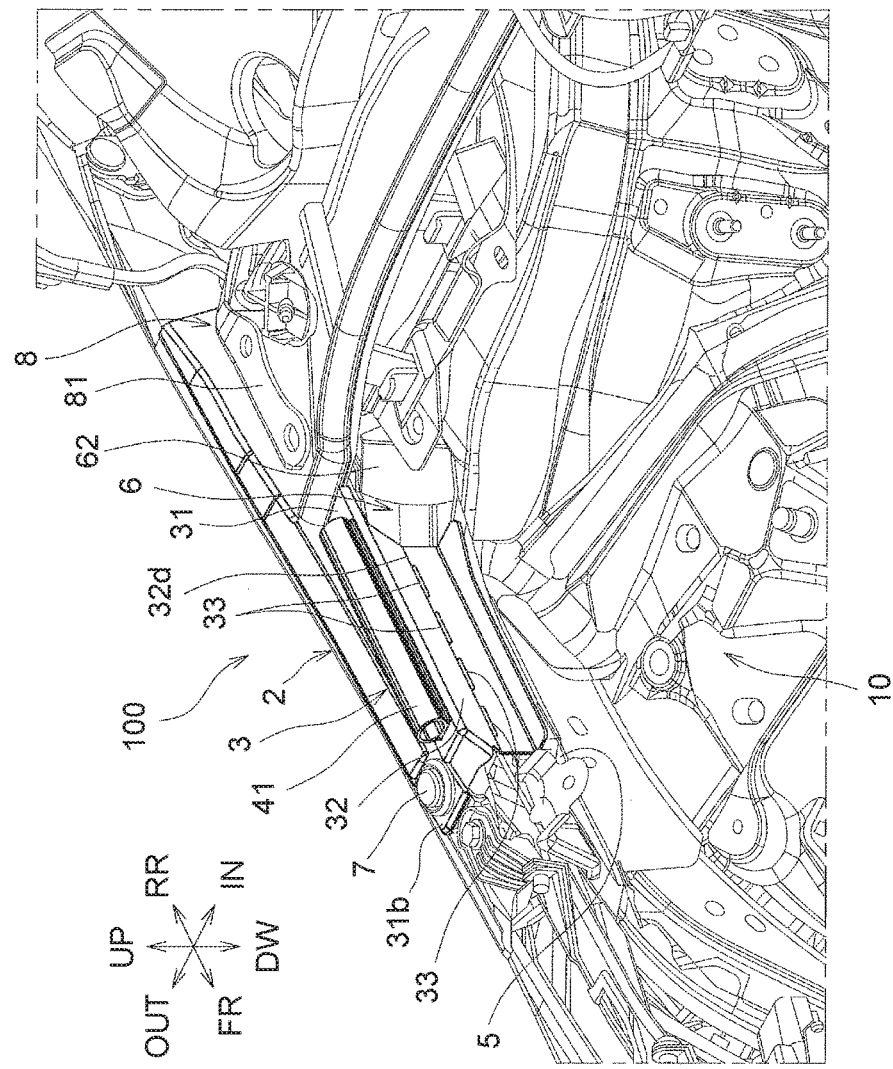
FIG. 2 is a perspective view showing the structure of main parts in an embodiment of the vehicle front structure of the present disclosure, and is a perspective view showing the structure of part X indicated in FIG. 1, with a hood removed.
Figure 3:
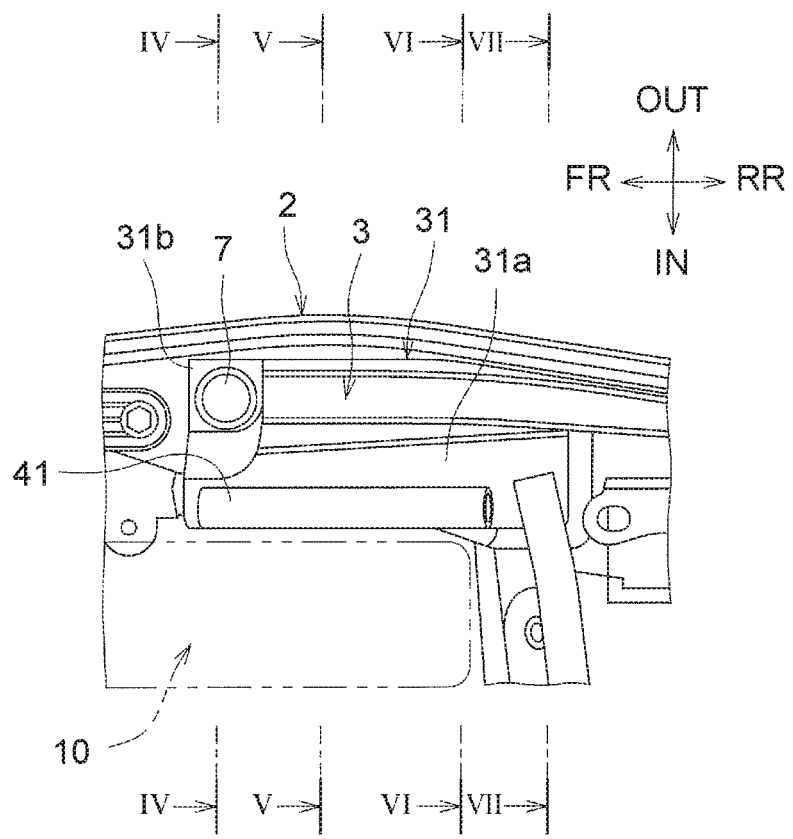
FIG. 3 is a plan view showing the structure of the main parts in the embodiment of the vehicle front structure of the present disclosure.

An embodiment of the present disclosure will be described below based on the drawings.

The embodiment of a vehicle front structure of the present disclosure will be described with reference to FIG. 1 to FIG. 9.

The arrow FR and the arrow RR shown as appropriate in FIG. 2 to FIG. 9 indicate a vehicle front side and a vehicle rear side, respectively. The arrow UP indicates a vehicle upper side, and the arrow DW indicates a vehicle lower side. The arrow IN indicates an inner side in a vehicle width direction, and the arrow OUT indicates an outer side in the vehicle width direction. For convenience, directions of a fender protector 3 as mounted in a vehicle front 100 are indicated by these arrows FR, RR, UP, DW, IN, and OUT in FIG. 8 and FIG. 9.

A metal hood 1 that covers an engine compartment room (engine compartment) 10 of the vehicle front 100 in an openable and closable manner is provided above the engine compartment room 10 in a vehicle up-down direction. The hood 1 includes a hood outer panel 11, and a hood inner panel 12 that is disposed farther on the lower side of the hood 1 than the hood outer panel 11, at a distance from the hood outer panel 11. An outer periphery of the hood outer panel 11 is connected by hemming to an outer periphery of the hood inner panel 12. The hood 1 is mounted on a mount piece 81 of a hood hinge 8 shown in FIG. 2, and is supported so as to be turnable around a hinge shaft (not shown) of the hood hinge 8.

In the structure of the vehicle front 100 of this embodiment, a parting line 20 that constitutes a border between the hood 1 and a front fender panel 2 is located in an upper part of a side surface of the vehicle front 100 (side parting structure). The parting line 20 extends in a vehicle front-rear direction.

The front fender panel 2 includes an outer wall section 21 that forms the side surface of the vehicle front 100, and an inner wall section 22 that is bent from the outer wall section 21 toward the inner side in the vehicle width direction at the parting line 20 between the hood 1 and the front fender panel 2. The inner wall section 22 includes a stepped inclined part 22*b* and a level part 22*a*.

An apron member (apron upper member) 5 is disposed at a position below the inner wall section 22 of the front fender panel 2 in the vehicle up-down direction. The apron member 5 is a body frame member and extends in the vehicle front-rear direction. The apron member 5 and the inner wall section 22 of the front fender panel 2 are separated from each other.

In this embodiment, the fender protector 3 that conceals a space (clearance) between the inner wall section 22 of the front fender panel 2 and the apron member 5 from the inner side in the vehicle width direction is provided.

Fender Protector

Next, the fender protector 3 will be described with reference to FIG. 2 to FIG. 9.

The fender protector 3 is a resin molding part (e.g., a polypropylene resin molding part), and integrally has a lateral wall 31 and a vertical wall 32. The lateral wall 31 extends in the vehicle front-rear direction, and the vertical wall 32 extends downward from an inner end of the lateral wall 31 in the vehicle width direction. The fender protector 3 further has three partition walls 35*a*, 35*b*, 35*c* and a bottom wall 35d (see FIG. 8) that are integrally formed behind the lateral wall 31 in the vehicle front-rear direction.

The lateral wall 31 has a level part 31a extending in the vehicle front-rear direction. A stepped portion that is one step lower than the level part 31a is formed at an end of the lateral wall 31 on the front side in the vehicle front-rear direction, on the outer side in the vehicle width direction, and this stepped portion serves as a mount part 31b. A mount hole 31c is provided in the mount part 31b. An upper sealant 41 made of an elastic material (e.g., rubber) is mounted on an upper surface of the level part 31a of the lateral wall 31 so that a longitudinal direction of the upper sealant 41 matches the vehicle front-rear direction. When the hood 1 closed, the upper sealant 41 is pressed against an inner surface of the hood inner panel 12 of the hood 1 in an elastically deformed state.

The lateral wall 31 is mounted on the level part 22a of the inner wall section 22 of the front fender panel 2. Specifically, the lateral wall 31 is positioned on the level part 22a of the inner wall section 22 of the front fender panel 2, and the mount hole 31c of the mount part 31b of the lateral wall 31 is aligned with a fixing hole 22c provided in the level part 22a of the front fender panel 2. In this state, a resin clip 7 is fitted into the mount hole 31c and the fixing hole 22c (see FIG. 4), and thereby the mount part 31b of the lateral wall 31 is joined to the level part 22a of the front fender panel 2. Thus, the fender protector 3 is mounted on the inner wall section 22 of the front fender panel 2.

The vertical wall 32 extends from a front end of the lateral wall 31 in the vehicle front-rear direction toward the vehicle rear side, and extends to an intermediate point of the fender protector 3. A cutout 34 through which part of a sound absorbent 6, to be described later, is protruded toward the inner side in the vehicle width direction is provided behind the vertical wall 32 in the vehicle front-rear direction (see FIG. 8).

The vertical wall 32 has an inclined part 32a that is bent from the inner end of the lateral wall 31 in the vehicle width direction toward the outer side in the vehicle width direction so as to incline at a predetermined angle θ relative to the vehicle up-down direction (see FIG. 5), and a lower wall part 32b that is provided so as to extend downward from a lower end of the inclined part 32a via a bend 32d.

The lower wall part 32b of the vertical wall 32 is slightly inclined toward the inner side in the vehicle width direction relative to the vehicle up-down direction. The lower wall part 32b integrally has a flange 32c that protrudes from a lower end of the lower wall part 32b toward the inner side in the vehicle width direction. The flange 32c extends along the vehicle front-rear direction, from a front end of the vertical wall 32 in the vehicle front-rear direction to a rear end thereof in the vehicle front-rear direction. A rear portion of the flange 32c in the vehicle front-rear direction has a shape bulging toward the inner side in the vehicle width direction so as to match the shape of an inner end of the apron member 5 in the vehicle width direction (see FIG. 5 and FIG. 8).

The bendability of the vertical wall 32 upon input of a load into the hood 1 from the upper side of the vehicle etc. are taken into account in setting the inclination angle θ of the inclined part 32a of the vertical wall 32 relative to the vehicle up-down direction (including the inclination angle of the lower wall part 32b relative to the vehicle up-down direction), the height position of the bend 32d of the vertical wall 32 in the vehicle up-down direction (the ratio between the lengths of the inclined part 32a and the lower wall part 32b), etc.

The fender protector 3 further has a plurality of (in this example, four) slit holes 33 that are discretely formed at a predetermined pitch at the bend 32d between the inclined part 32a and the lower wall part 32b of the vertical wall 32. A longitudinal direction of each slit hole 33 matches the vehicle front-rear direction.

When the fender protector 3 having the above structure is mounted on the inner wall section 22 of the front fender panel 2, the flange 32c at a lower end portion of the lower wall part 32b of the vertical wall 32 is disposed above the inner end of the apron member 5 in the vehicle width direction, at a predetermined distance from this inner end. A lower sealant 42 is sandwiched between a lower surface of the flange 32c of the lower wall part 32b and the upper surface of the apron member 5 in an elastically deformed (compressed) state.

Figure 8:
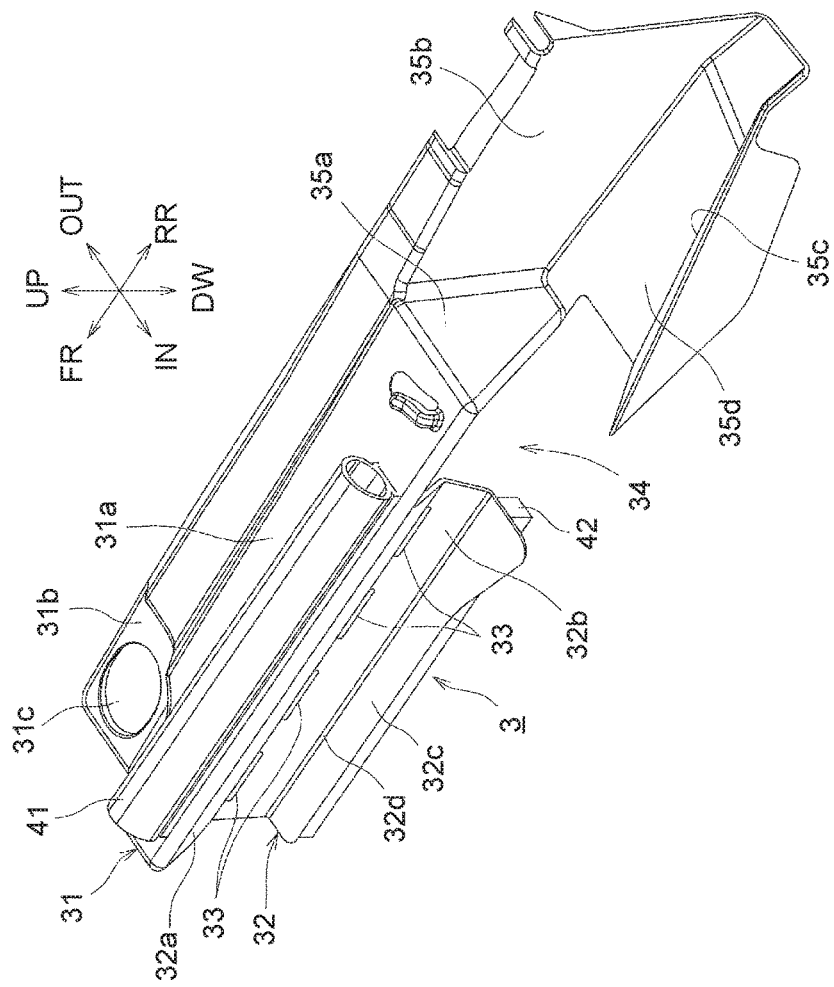
FIG. 8 is a perspective view showing the structure of a fender protector.

The lower sealant 42 is a sealant having a rectangular cross-sectional shape, and extends from a front end in the vehicle front-rear direction of the flange 32c at the lower end portion of the lower wall part 32b of the vertical wall 32 to a rear end thereof in the vehicle front-rear direction (see FIG. 8). The lower sealant 42 prevents the penetration of noise and heat from the engine compartment room 10 to the outer side of the vertical wall 32 of the fender protector 3 in the vehicle width direction (into the vehicle cabin) through the space between the lower end of the fender protector 3 (the lower surface of the flange 32c) and the upper surface of the apron member 5.

A sealant having excellent sound insulating property and heat insulating property is used as the lower sealant 42. Specifically, for example, a sealant that is composed of a foam layer of synthetic rubber foam having a semi-independent bubble structure and an acrylic tape layer laminated on one side of this foam layer, of which the tape layer is attached to the lower surface of the flange 32c of the fender protector 3, is used as the lower sealant 42. Alternatively, a butyl tape layer may be used as the tape layer.

Moreover, when the fender protector 3 is mounted on the inner wall section 22 of the front fender panel 2, a leading end on the inner side in the vehicle width direction of the flange 32c at the lower end portion of the lower wall part 32b of the vertical wall 32 is located farther on the inner side in the vehicle width direction than the inner end of the apron member 5 in the vehicle width direction.

Figure 9:
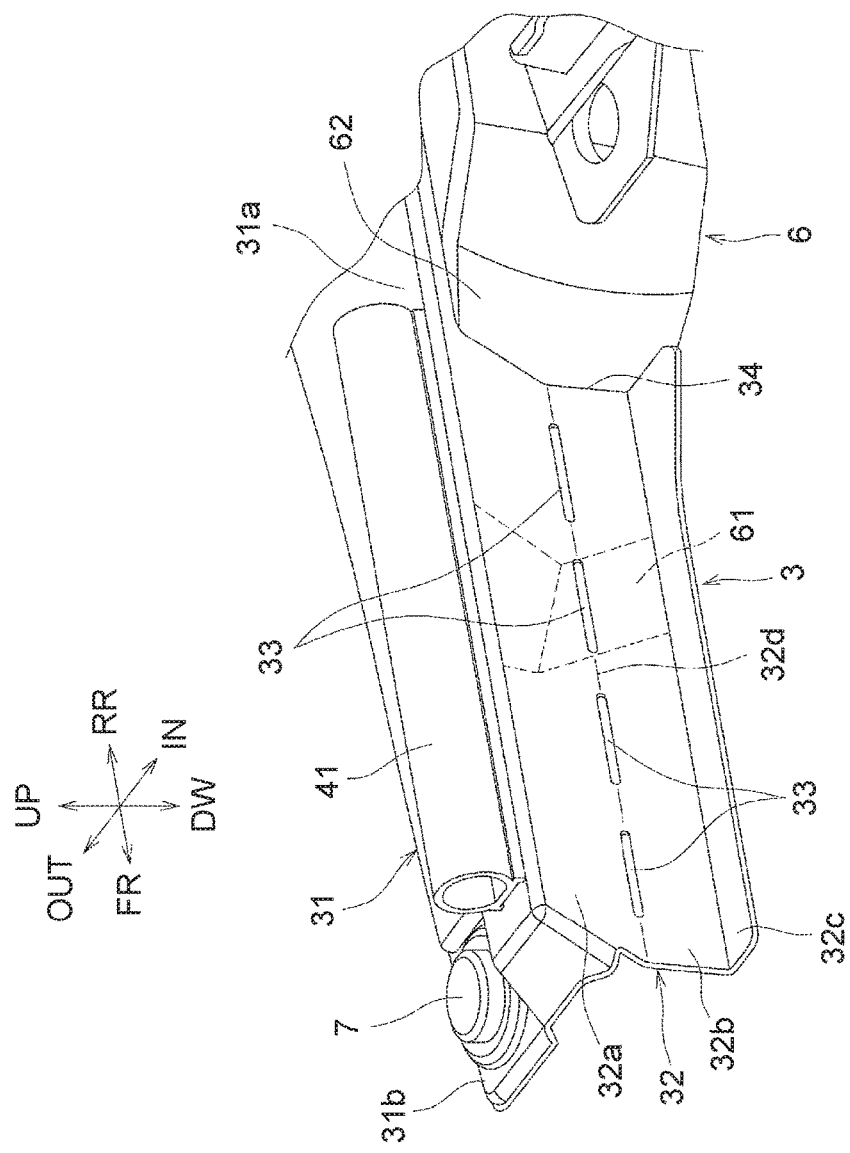
FIG. 9 is a perspective view showing the structures of the fender protector and a sound absorbent.

The vehicle front structure of this embodiment further has the sound absorbent 6. For example, ethylene-propylene-diene rubber (EPDM) can be used as the material for the sound absorbent 6. As shown in FIG. 9, the sound absorbent 6 integrally has an outer part 61 that is disposed on the outer side of the vertical wall 32 of the fender protector 3 in the vehicle width direction, and an inner part 62 that protrudes toward the inner side of the vertical wall 32 of the fender protector 3 in the vehicle width direction through the cutout 34 provided behind the vertical wall 32 in the vehicle front-rear direction.

The outer part 61 of the sound absorbent 6 is packed in a space S (see FIG. 6) formed between the fender protector 3 and the front fender panel 2, and is in close contact with an inner surface of the front fender panel 2 (inner surfaces of the outer wall section 21 and the inner wall section 22) and the fender protector 3 (inner surfaces of the lateral wall 31 and the vertical wall 32). The inner part 62 of the sound absorbent 6 is disposed so as to close a space (clearance) between the fender protector 3 and a cowl louver (not shown). The inner part 62 of the sound absorbent 6 is in close contact with an inner peripheral edge of the cutout 34 including a rear end surface of the vertical wall 32 of the fender protector 3 in the vehicle front-rear direction.

In this embodiment, each clearance formed among the hood 1, the fender protector 3, and the cowl louver (not shown) is sealed with a sealant.

Effects

As has been described above, according to this embodiment, the fender protector 3 that conceals the space between the inner wall section 22 of the front fender panel 2 and the apron member 5 from the inner side in the vehicle width direction is provided, which improves the appearance of the interior of the engine compartment room 10.

The vertical wall 32 of the fender protector 3 is composed of the inclined part 32*a* that is inclined from the inner end of the lateral wall 31 in the vehicle width direction toward the outer side in the vehicle width direction, and the lower wall part 32*b* that is provided so as to extend downward from the lower end of the inclined part 32*a* via the bend 32*d*. Thus, when a load is input into the hood 1 from the upper side of the vehicle, the vertical wall 32 of the fender protector 3 bends at the bend 32*d* between the inclined part 32*a* and the lower wall part 32*b*, and thereby absorbs the impact due to the input load. Moreover, the slit holes 33 are formed at the bend 32*d* of the vertical wall 32 between the inclined part 32*a* and the lower wall part 32*b*, which allows the vertical wall 32 to bend easily upon input of a load from the upper side of the vehicle and to absorb the impact due to the input load more effectively. Thus, this structure can secure pedestrian protection performance by being able to absorb, with enhanced effect, an impact of a pedestrian hitting his or her head on the hood 1.

The lower sealant 42 is provided in the space (clearance) between the lower end portion (flange 32*c*) of the fender protector 3 and the upper surface of the apron member 5. Thus, this structure can also secure NV performance by being able to reduce the transmission of noise from the engine compartment room 10 into the vehicle cabin through the area where the fender protector 3 is disposed.

According to this embodiment, therefore, both pedestrian protection performance and NV performance can be secured.

Figure 4:
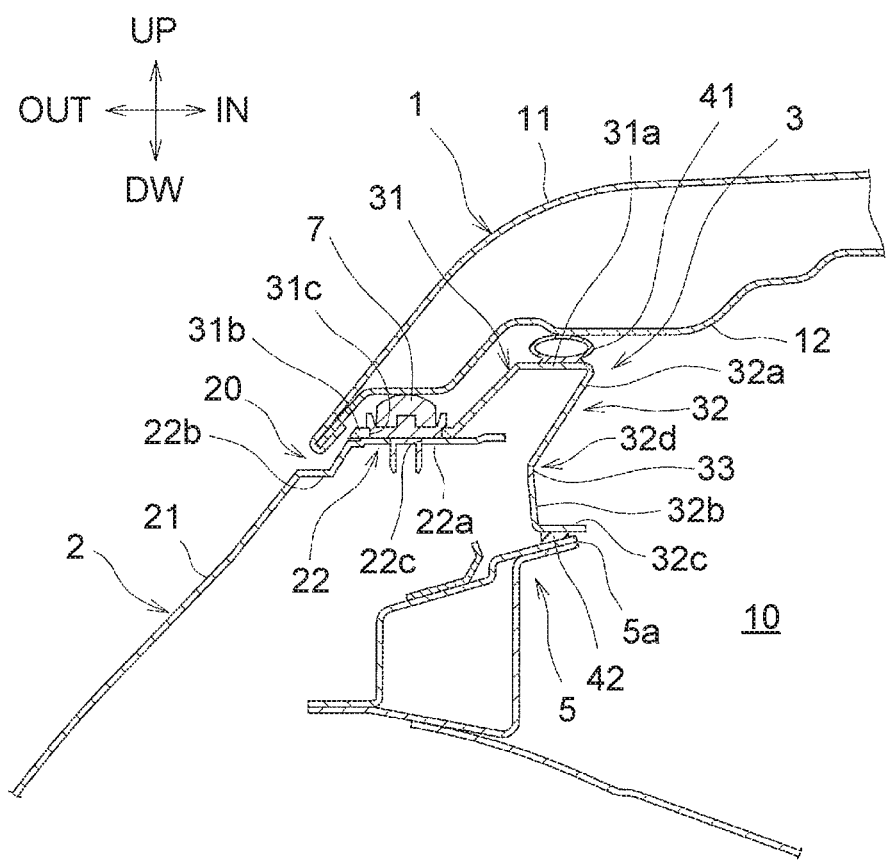
FIG. 4 is a sectional view corresponding to section IV-IV of FIG. 3.
Figure 5:
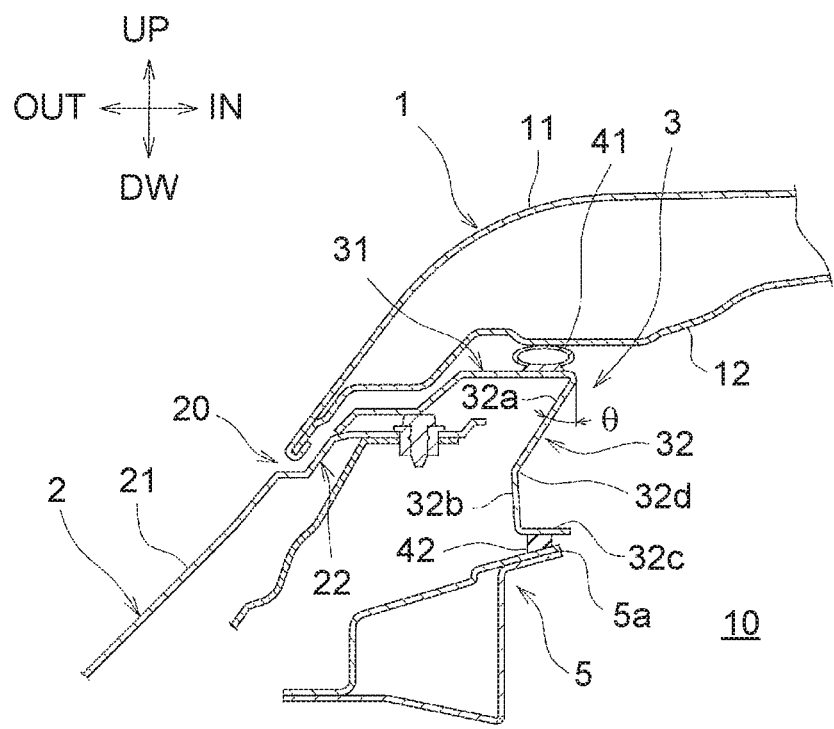
FIG. 5 is a sectional view corresponding to section V-V of FIG. 3.
Figure 6:
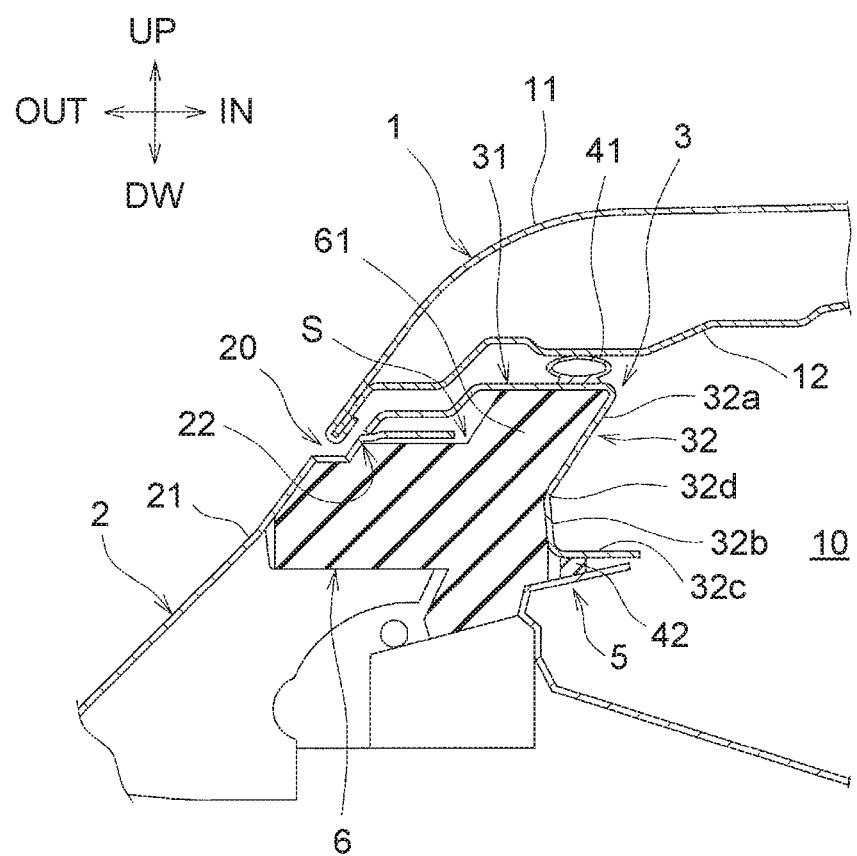
FIG. 6 is a sectional view corresponding to section VI-VI of FIG. 3.

In this embodiment, the inclined part 32*a* of the vertical wall 32 of the fender protector 3 is inclined from the inner end of the lateral wall 31 in the vehicle width direction toward the outer side in the vehicle width direction (see FIG. 4 to FIG. 6 etc.). Because of this structure, the vertical wall 32 of the fender protector 3 bends toward the outer side in the vehicle width direction, i.e., toward the opposite side from the engine compartment room 10, upon input of a load from the upper side of the vehicle, so that interference of the bent vertical wall 32 with devices, pipes, etc. present inside the engine compartment room 10 can be avoided. In addition, when the inclined part 32*a* of the vertical wall 32 is inclined from the inner end of the lateral wall 31 in the vehicle width direction toward the outer side in the vehicle width direction, the number of edge lines of the fender protector 3 that are visible from the upper side of the vehicle when the hood 1 is opened can be reduced, which contributes to further improvement of the appearance.

In this embodiment, the leading end on the inner side in the vehicle width direction of the flange 32*c* at the lower end portion of the vertical wall 32 of the fender protector 3 is located farther on the inner side in the vehicle width direction than the inner end of the apron member 5 in the vehicle width direction. Thus, a metal sheet part 5*a* of the apron member 5 (see FIG. 4 and FIG. 5) becomes less visible from the outside of the vehicle when the hood 1 is opened, which contributes to further improvement of the appearance.

In this embodiment, an enhanced sealing effect can be secured, since the lower surface of the flange 32*c* at the lower end portion of the vertical wall 32 of the fender protector 3 and the lower sealant 42 can be brought into close surface contact with each other, and the upper surface of the apron member 5 and the lower sealant 42 can be brought into close surface contact with each other.

Figure 7:
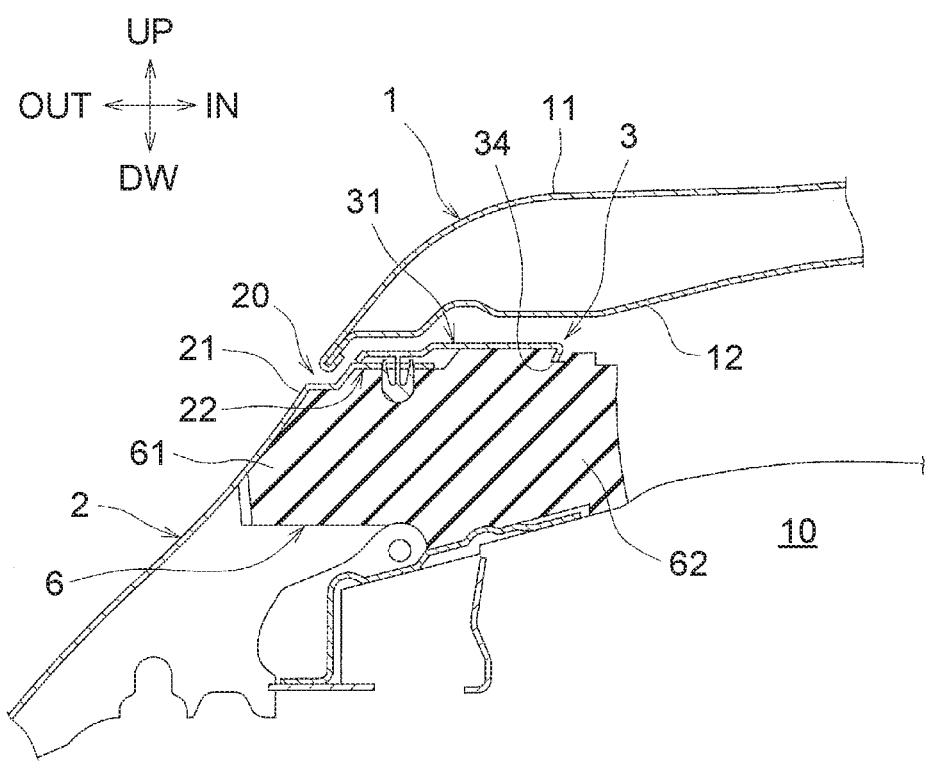
FIG. 7 is a sectional view corresponding to section VII-VII of FIG. 3.

In this embodiment, the sound absorbent 6 is packed in the space S formed between the fender protector 3 and the front fender panel 2 (see FIG. 7). Thus, even when the slit holes 33 are formed at the bend 32*d* of the vertical wall 32, the transmission of noise and heat from the engine compartment room 10 into the vehicle cabin can be reduced.

While the vehicle front structure in a right-side part (part X in FIG. 1) of the vehicle front 100 has been described in the above embodiment, a fender protector having basically the same structure as the fender protector 3 shown in FIG. 2 to FIG. 9 is also mounted in a vehicle front structure in a left-side part of the vehicle front 100.

Other Embodiments

The embodiment disclosed herein is in every respect merely illustrative and does not constitute a basis for narrow interpretation. Therefore, the technical scope of the present disclosure is defined based not only on the above embodiment but on the description of the claims. The technical scope of the present disclosure includes all possible changes that are equivalent in meaning and scope to the claims.

For example, in the above embodiment, the inclined part 32*a* of the vertical wall 32 of the fender protector 3 is inclined from the inner end of the lateral wall 31 in the vehicle width direction toward the outer side in the vehicle width direction. However, the present disclosure is not limited to this example, and the inclined part of the vertical wall 32 of the fender protector 3 may be inclined from the inner end of the lateral wall 31 in the vehicle width direction toward the inner side in the vehicle width direction.

In the above embodiment, the four slit holes 33 are formed at the bend 32*d* between the inclined part 32*a* and the lower wall part 32*b* of the vertical wall 32. However, the number of the slit holes formed at the bend 32*d* is not particularly limited.

In the above embodiment, the slit holes 33 are formed at the bend 32*d* between the inclined part 32*a* and the lower wall part 32*b* of the vertical wall 32. However, the present disclosure is not limited to this example, and a notch (e.g., a cutout having a V-sectional shape) may be formed at the bend 32*d* between the inclined part 32*a* and the lower wall part 32*b* of the vertical wall 32 to allow the vertical wall 32 to bend easily. As such a slit hole or notch is provided to allow the vertical wall 32 to bend easily, it is not absolutely necessary to form such a slit hole or notch.

In the above embodiment, the flange 32*c* is formed on the lower wall part 32*b* of the vertical wall 32 of the fender protector 3. However, the present disclosure is not limited to this example, and the lower wall part 32*b* of the vertical wall 32 may have another shape. For example, the lower end portion of the lower wall part 32*b* of the vertical wall 32 of the fender protector 3 may have a curved shape curved toward the inner side in the vehicle width direction, and a leading end of the curved part on the inner side in the vehicle width direction may be located farther on the inner side in the vehicle width direction than the inner end of the apron member 5 in the vehicle width direction, so as to make the metal sheet part 5a of the apron member 5 less visible from the outside of the vehicle.

The present disclosure can be effectively used in a vehicle front structure in which a space between an inner wall section of a fender panel and an apron member is concealed with a fender protector.

What is claimed is:

1. A vehicle front structure, comprising:
    a fender panel having an outer wall section that forms a side surface of a vehicle front, and an inner wall section bent from the outer wall section inward in a vehicle width direction at a parting line between a hood of a vehicle and the fender panel;
    an apron member disposed below the inner wall section of the fender panel in a vehicle up-down direction, the apron member extending in a vehicle front-rear direction;
    a fender protector disposed so as to cover a space between the inner wall section of the fender panel and the apron member,
        the fender protector having a lateral wall that is mounted on the inner wall section of the fender panel, and a vertical wall extending from an inner end of the lateral wall in the vehicle width direction toward a lower side in the vehicle up-down direction,
        the vertical wall having an inclined part and a lower wall part, the inclined part being bent from the inner end of the lateral wall in the vehicle width direction toward the lower side in the vehicle up-down direction and extending so as to incline relative to the vehicle up-down direction, the lower wall part being provided so as to extend from a lower end of the inclined part via a bend toward the lower side in the vehicle up-down direction; and
    a sealant provided between a lower end portion of the lower wall part and the apron member.

2. The vehicle front structure according to claim 1, wherein
    the inclined part is inclined from the inner end of the lateral wall in the vehicle width direction toward an outer side in the vehicle width direction.

3. The vehicle front structure according to claim 1, wherein
    the fender protector has a slit hole at the bend.

4. The vehicle front structure according to claim 1, wherein
    a leading end of the lower end portion of the lower wall part is located inward of an inner end of the apron member in the vehicle width direction.

5. The vehicle front structure according to claim 1, wherein:
    the fender protector has a flange that protrudes inward in the vehicle width direction from a lower end of lower end portion of the lower wall part; and
    the sealant is provided between a lower surface of the flange and an upper surface of the apron member.

6. The vehicle front structure according to claim 5, wherein
    a leading end of an inner end of the flange in the vehicle width direction is located inward of the inner end of the apron member in the vehicle width direction.

7. The vehicle front structure according to claim 1, wherein
    a sound absorbent is packed between the fender protector and the fender panel.

8. The vehicle front structure according to claim 1, wherein
    an angle formed between the lower wall part and the vehicle up-down direction is smaller than an angle formed between the inclined part and the vehicle up-down direction.

* * * * *